United States Patent
Hung (10) Patent No.: US 9,218,522 B2
(45) Date of Patent: Dec. 22, 2015

(54) METHOD FOR DETERMINING FINGERPRINT AUTHENTICITY AND DEVICE FOR THE SAME

(71) Applicant: Gingy Technology Inc., Hsinchu (TW)

(72) Inventor: Chun-Lang Hung, Hsinchu (TW)

(73) Assignee: GINGY TECHNOLOGY INC., Hsinchu (TW)

( * ) Notice: Subject to any disclaimer, the term of this patent is extended or adjusted under 35 U.S.C. 154(b) by 5 days.

(21) Appl. No.: 14/029,468

(22) Filed: Sep. 17, 2013

(65) Prior Publication Data

US 2015/0078633 A1 Mar. 19, 2015

(51) Int. Cl.
    *G06K 9/00* (2006.01)
(52) U.S. Cl.
    CPC .......... *G06K 9/00114* (2013.01); *G06K 9/0012* (2013.01)
(58) Field of Classification Search
    None
    See application file for complete search history.

(56) References Cited

U.S. PATENT DOCUMENTS

2005/0265586 A1* 12/2005 Rowe et al. .................. 382/124
2006/0285729 A1* 12/2006 Kim et al. .................... 382/124
2012/0219194 A1*  8/2012 Monden ....................... 382/124

OTHER PUBLICATIONS

Yau, Wei-Yun, et al. "Fake finger detection by finger color change analysis." Advances in Biometrics. Springer Berlin Heidelberg, 2007. 888-896.*
Butler, Joseph. Automated Fingertip Detection. Diss. Brigham Young University, 2012.*

* cited by examiner

*Primary Examiner* — Menatoallah Youssef
(74) *Attorney, Agent, or Firm* — Tim Tingkang Xia, Esq.; Locke Lord LLP (57) ABSTRACT

A method capable of determining fingerprint authenticity is disclosed. The method includes capturing a fingerprint image, performing an analysis program when executed analyzing the fingerprint image using a first color model to obtain a first chromaticity coordinate corresponding to the fingerprint image, performing a conversion program when executed converting the first chromaticity coordinate into a second chromaticity coordinate, performing a verification program when executed determining whether the second chromaticity coordinate satisfies a second predetermined skin color threshold, when the second chromaticity coordinate satisfies the second predetermined skin color threshold confirming the fingerprint image is authentic, and concluding the fingerprint image is forged when the second chromaticity coordinate fails to satisfy the second predetermined skin color threshold.

8 Claims, 8 Drawing Sheets

METHOD FOR DETERMINING FINGERPRINT AUTHENTICITY AND DEVICE FOR THE SAME

BACKGROUND OF THE INVENTION

1. Field of the Invention

The instant disclosure relates to fingerprint authenticity determination, and more particularly, to a method for determining fingerprint authenticity with more than one protection mechanism and a device using the same.

2. Description of Related Art

In order to provide better protection for information in electronic devices notwithstanding its sensitivity level, user identity needs to be verified before the information could be accessed. Traditionally, the user name and its corresponding password are required for the access to the information. More specifically, the accuracy of the inputted user name and password need to be verified before any information in the electronic devices could be accessed. Even so, the entry of the password may be subject to unauthorized peeking or eavesdropping. Plus, since more than one set of the password may be necessary for the data security purpose, the likelihood of the password getting lost may increase at the same time.

Therefore, biometrics-based data protection mechanism has been introduced to remedy the above-mentioned problems. For example: iris, voiceprint, and/or fingerprint have been used to enhance the data security of the electronic devices. Because of the uniqueness of the fingerprint and the relatively reduced cost of the implementation of the fingerprint verification, the fingerprint has been widely used as one of the most important bio-characteristics for the access to the electronic device.

Generally, three-dimensional (3D) identification technology is employed in the fingerprint verification. Specifically, the deformation of the finger at the time of the finger pressing and the fingerprint on the specific finger are utilized in determining the authenticity of the finger. However, the finger could be forged using the silicone material to replicate the fingerprint and even capillaries of the finger. As such, it is likely that the forged finger with the replicated fingerprint and the capillaries may duplicate the deformation of the finger and therefore get around the fingerprint verification mechanism in the electronic device, making the user identity verification more difficult and failing to distinguish the authentic fingerprint from the forged one.

SUMMARY OF THE INSTANT DISCLOSURE

In view of aforementioned problem where the silicone-made finger could simulate the actual deformation associated with the finger pressing and even duplicate the fingerprint on the authentic finger, the traditional fingerprint authenticity may not be able to distinguish such manmade finger from the authentic finger. Thus, the instant disclosure discloses a method and a device capable of curing the problem the manmade silicone finger could pass the conventional verification of the fingerprint authentication.

The method in the instant disclosure may include capturing a fingerprint image, performing an analysis program when executed analyzing the fingerprint image using a first color model to obtain a first chromaticity coordinate corresponding to the fingerprint image, performing a conversion program when executed converting the first chromaticity coordinate into a second chromaticity coordinate, performing a verification program when executed determining whether the second chromaticity coordinate satisfies a second predetermined skin color threshold, when the second chromaticity coordinate satisfies the second predetermined skin color threshold confirming the fingerprint image is authentic, and concluding the fingerprint image is forged when the second chromaticity coordinate fails to satisfy the second predetermined skin color threshold.

The device disclosed in the instant disclosure may include a light-emitting element for emitting a light to a finger and an image sensor for receiving a reflected light from the finger to obtain a fingerprint image. The disclosed device may also include a processing module. The processing module may further include an analysis program for analyzing the fingerprint image using a first color model to obtain a first chromaticity coordinate, a conversion program for converting the first chromaticity coordinate to a second chromaticity coordinate using a second color model, and a verification program for determining whether the second chromaticity coordinate satisfies a second predetermined skin color threshold.

The disclosed method and device may therefore enhance the accuracy of confirming the authenticity of the fingerprint by remedying the potential drawbacks in the traditional approach which may not be effectively prevent the manmade finger from being verified as the authentic finger.

Specifically, since the manmade finger may be equipped with duplicated capillaries allowing for such manmade finger to get around the traditional approach having conversion from one chromaticity coordinate to another chromaticity coordinate.

The instant disclosure as previously mentioned employs the chromaticity conversion and compares the converted chromaticity coordinate with the predetermined skin color threshold, in order to verify whether the fingerprint contains the actual but not the manmade capillaries. Consequently, the characteristics of the skin color changes in the first chromaticity coordinate on basis of which the fingerprint could be forged may not be taken advantage of, enhancing the accuracy of the verification of the authenticity of the fingerprint.

In order to further the understanding regarding the instant disclosure, the following embodiments are provided along with illustrations to facilitate the disclosure of the instant disclosure.

DETAILED DESCRIPTION OF THE EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

MAJOR COMPONENT SYMBOL DESCRIPTION

100 Device capable of determining fingerprint authenticity
110 Pressing plate
120 Circuit board
130 Light-emitting element
140 Image sensor
150 Processing module
151 Analysis program
152 Conversion program
153 Verification program
300 Finger
400 Fingerprint image
410 Sub-fingerprint image
210: Capture the fingerprint image of the finger
220: Perform analysis program using the first color model to analyze the fingerprint image to obtain the first chromaticity coordinate corresponding to the fingerprint image
230: Perform the conversion program converting the first chromaticity coordinate to the second chromaticity coordinate according to the second color model
240: Perform the verification program to determine whether the second chromaticity coordinate satisfies the second predetermined skin color threshold
250: Confirm the authenticity of the fingerprint when the second chromaticity satisfies the second predetermined skin color threshold
260: Conclude the finger as the forged one when the second chromaticity coordinate fails to satisfy the second predetermined skin color threshold.

Figure 1:
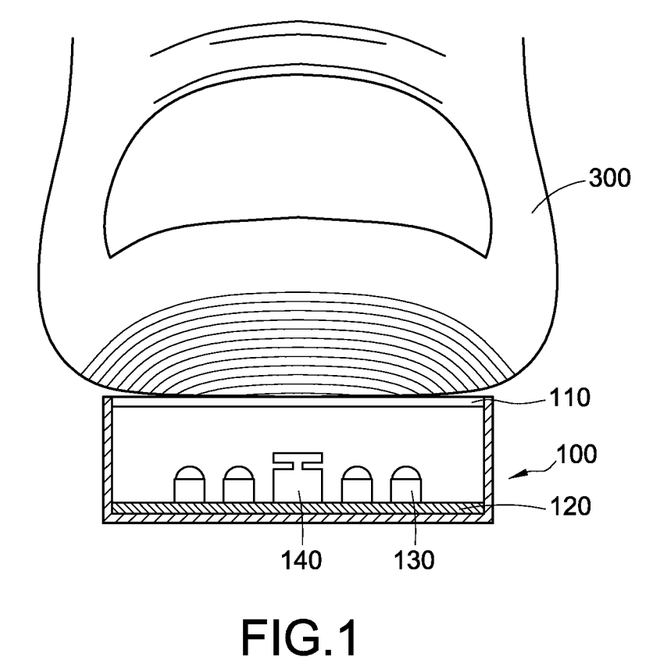
FIG. 1 is a schematic diagram of a device capable of determining fingerprint authenticity according to one embodiment of the instant disclosure.
Figure 2:
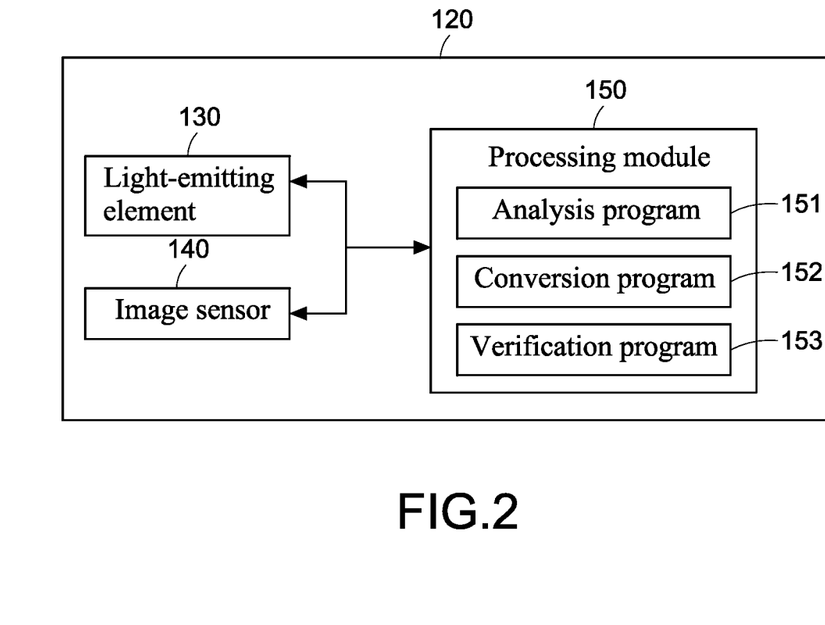
FIG. 2 is a simplified block diagram of a device capable of determining fingerprint authenticity according to one embodiment of the instant disclosure.

Please refer to FIGS. 1 and 2 illustrating a schematic diagram and a block diagram of a device 100 capable of determining fingerprint authenticity according to one embodiment of the instant disclosure, respectively. The above-mentioned device 100 may include a pressing plate 110 defining an area on which the finger of the human operator may place, a circuit board 120, at least one light-emitting element 130, an image sensor 140 and a processing module 150. The light-emitting element 130, the image sensor 140 and the processing module 150 may be disposed on the circuit board 120 and the processing module 150 may be electrically coupled to the light-emitting element 130 and the image sensor 140. In one implementation, the light emitting-element 130 may be a light-emitting diode (LED). It is worth noting that the light-emitting element 130 may be implemented in another form.

The pressing plate 110 may be made of, but not limited to, optical glass BK7 or Polymethyl methacrylate PMMA). Furthermore, in addition to being transparent the pressing plate 110 may be trapezoid in shape or implemented in terms of a prism type. An upper surface of the pressing plate 110 may allow for the placement of a finger 300 of the human operator, and the light emitting element 130 and the image sensor 140 are separated by a predetermined distance from the pressing plate 110 and face a lower surface of the pressing plate 110. When the finger 300 contacts the upper surface of the pressing plate 110, the processing module 150 may drive the light-emitting element 130, which in turn may output a scanning light to be irradiated on the surface of the finger 300 through the pressing plate 110.

It is also worth noting that the light-emitting element 130 may emit a light in a single wavelength or another light with multiple wavelengths. When the light in the single wavelength is emitted, the image sensor 140 may capture the gray-scale fingerprint image coming from the reflected light associated with the finger 300. On the other hand, when the light emitted from the light-emitting element 130 is with the multiple wavelengths the image sensor 140 may capture the fingerprint image in multiple colors. The image sensor 140 may be implemented in terms of a charge-coupled device (CCD) camera or a complementary metal oxide semiconductor (CMOS) sensor.

When the image sensor 140 receives the fingerprint image, the image sensor 140 may further transmit the received fingerprint image to the processing module 150. The processing module 150 may include an analysis program 151, a conversion program 152 and a verification program 153. The analysis program 151 may utilize a first color model for analyzing the fingerprint image. In one implementation, the first color model is a RGB color model. The conversion program 152 when executed may convert a first chromaticity coordinate of the first color model into a corresponding second chromaticity coordinate. The verification program 153 when executed may determine whether the second chromaticity coordinate satisfies a second predetermined skin color threshold.

Figure 3:
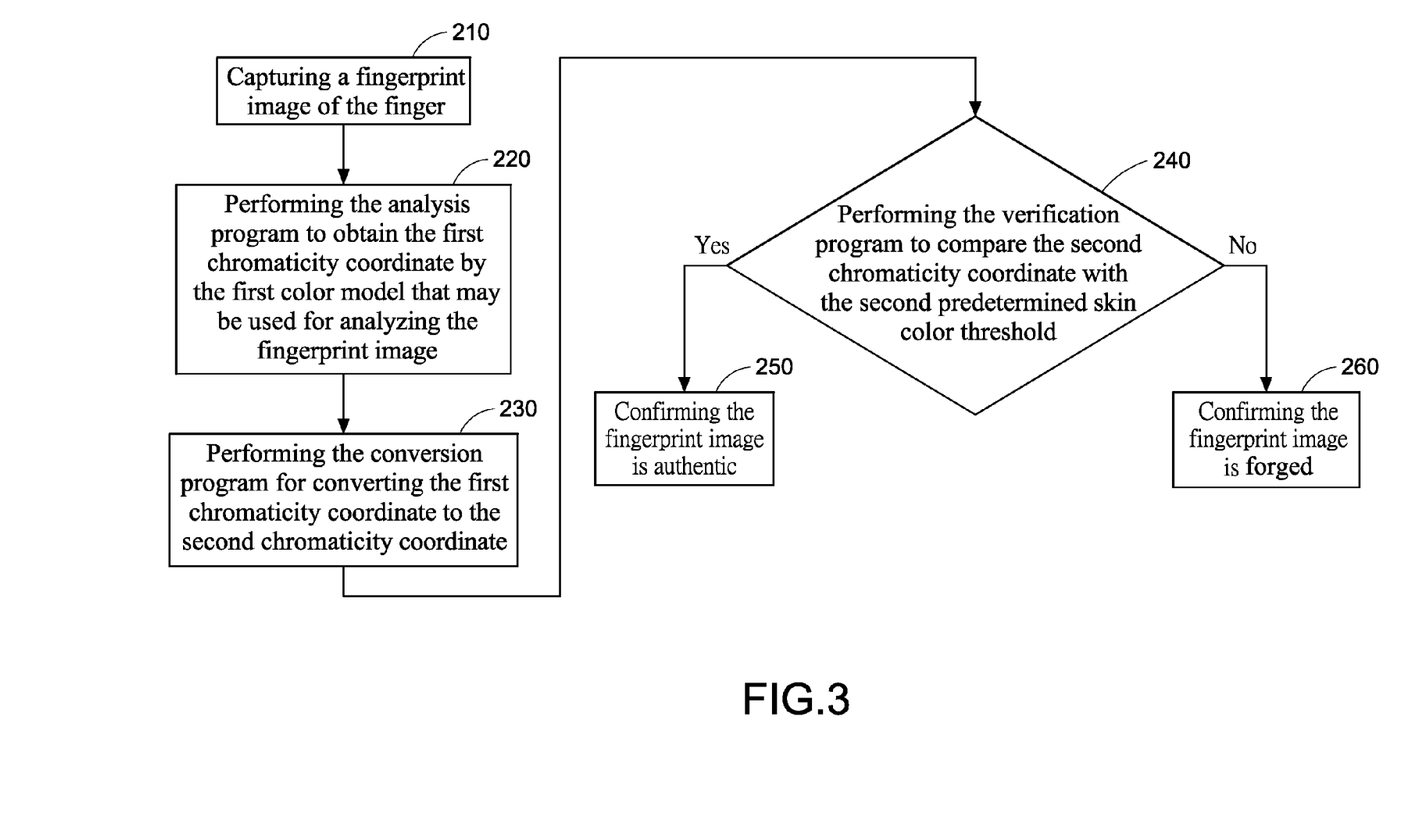
FIG. 3 shows a flow of a method for determining fingerprint authenticity according to one embodiment of the instant disclosure.

In conjunction with FIGS. 1 and 2, please refer to FIG. 3 illustrating a flow of a method for determining fingerprint authenticity according to one embodiment of the instant disclosure. The method may include the following steps: capturing a fingerprint image 400 of the finger 300 (step 210), performing the analysis program 151 to obtain the first chromaticity coordinate by the first color model that may be used for analyzing the fingerprint image 400 (step 220), performing the conversion program 152 for converting the first chromaticity coordinate to the second chromaticity coordinate (step 230), performing the verification program 153 to compare the second chromaticity coordinate with the second predetermined skin color threshold (step 240), and confirming the fingerprint image 400 is authentic when the second chromaticity coordinate satisfies the second skin color threshold (step 250). The method may further include another step (step 260) for concluding the fingerprint image 400 is a forged one when the second chromaticity coordinate fails to satisfy the second skin color threshold.

Figure 4:
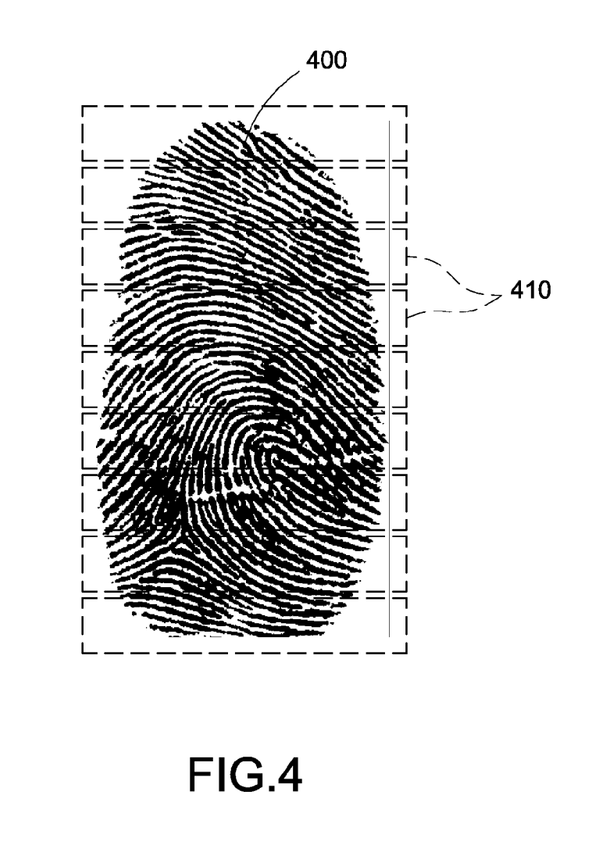
FIG. 4 shows a schematic diagram of capturing the fingerprint image according to one embodiment of the instant disclosure.

In step 210, the device may detect whether the finger 300 has been placed on the pressing plate 110 before causing the processing module 150 causes the light-emitting element 130 to emit the light to where the finger 300 is located. In the present embodiment, the light emitting element is a multi-wavelength light source. The light emitted to the finger 300 may be reflected by the finger 300, so that the image sensor 140 may receive the corresponding reflected light and the fingerprint image accordingly. The image sensor 140 as previously mentioned may transmit the fingerprint image to the processing module 150 for further processing. Please refer to FIG. 4 illustrating capturing the fingerprint image according to one embodiment of the instant disclosure. Specifically, the processing module 150 may divide the complete fingerprint image 400 into a plurality of sub-fingerprint images 410. Thereafter, the processing module 150 may sequentially transmit these sub-fingerprint images 410 to the analysis program 151 where step 220 could be performed.

Figure 5:
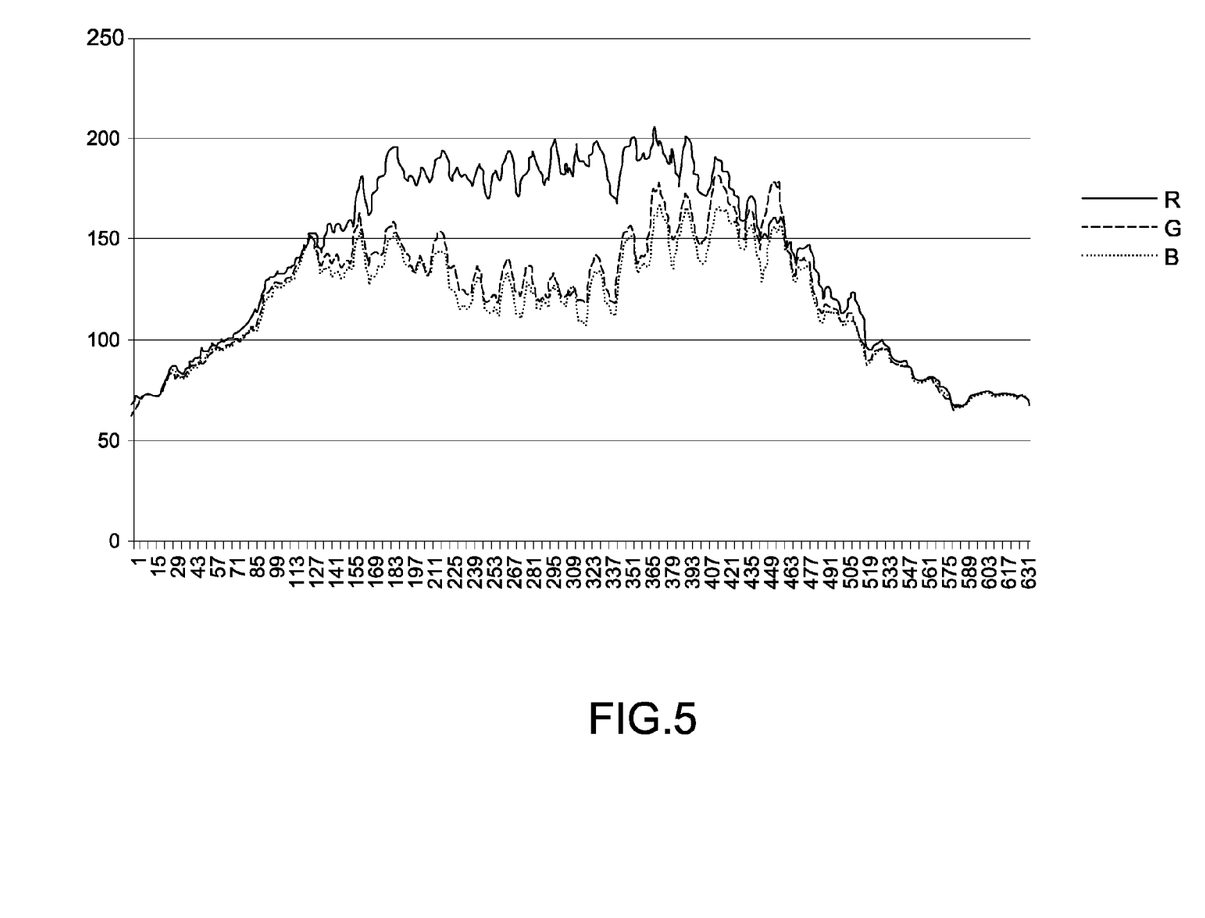
FIG. 5 shows a schematic diagram of the first chromaticity coordinate of the finger pressing according to one embodiment of the instant disclosure.

In step 220, the analysis program 151 may analyze the sub-fingerprint images 410 one by one using the first color model to obtain the corresponding first chromaticity coordinate. Please refer to FIG. 5 illustrating a schematic diagram of the first chromaticity coordinate of the finger according to one embodiment of the instant disclosure. The sub-fingerprint image 410 may be processed by the analysis program 151 by the first color model before the first chromaticity coordinate corresponding to the sub-fingerprint image 410 could be obtained. In this embodiment, the first color model may be the RGB color model.

X-axis of the first chromaticity coordinate may represent the resolution (for example, 640*480 resolution) when Y-axis of the first chromaticity coordinate may indicate the pixels. The resolution represented by the X-axis could be at 320*240 and may vary from case to case satisfying the actual requirements in different embodiments. Additionally, curves R, G, and B represent the red wavelength, the green wavelength, and the blue wavelength, respectively. Plus, since the skin color of the finger may change when the finger presses the pressing plate (in other words, a part of the finger blood flow may stay at the position where the pressing of the finger takes place while other part of the finger blood flow may travel to areas surrounding the location of the finger pressing, resulting in conspicuous color change). Therefore, as shown in FIG. 5 illustrative of the first chromaticity coordinate of the finger pressing, because of the part of the finger blood flow stay at the location of the finger pressing in Y-axis coordinate value the red wavelength curve R may be significantly larger than both the green wavelength curve G and blue wavelength curve B.

Figure 6:
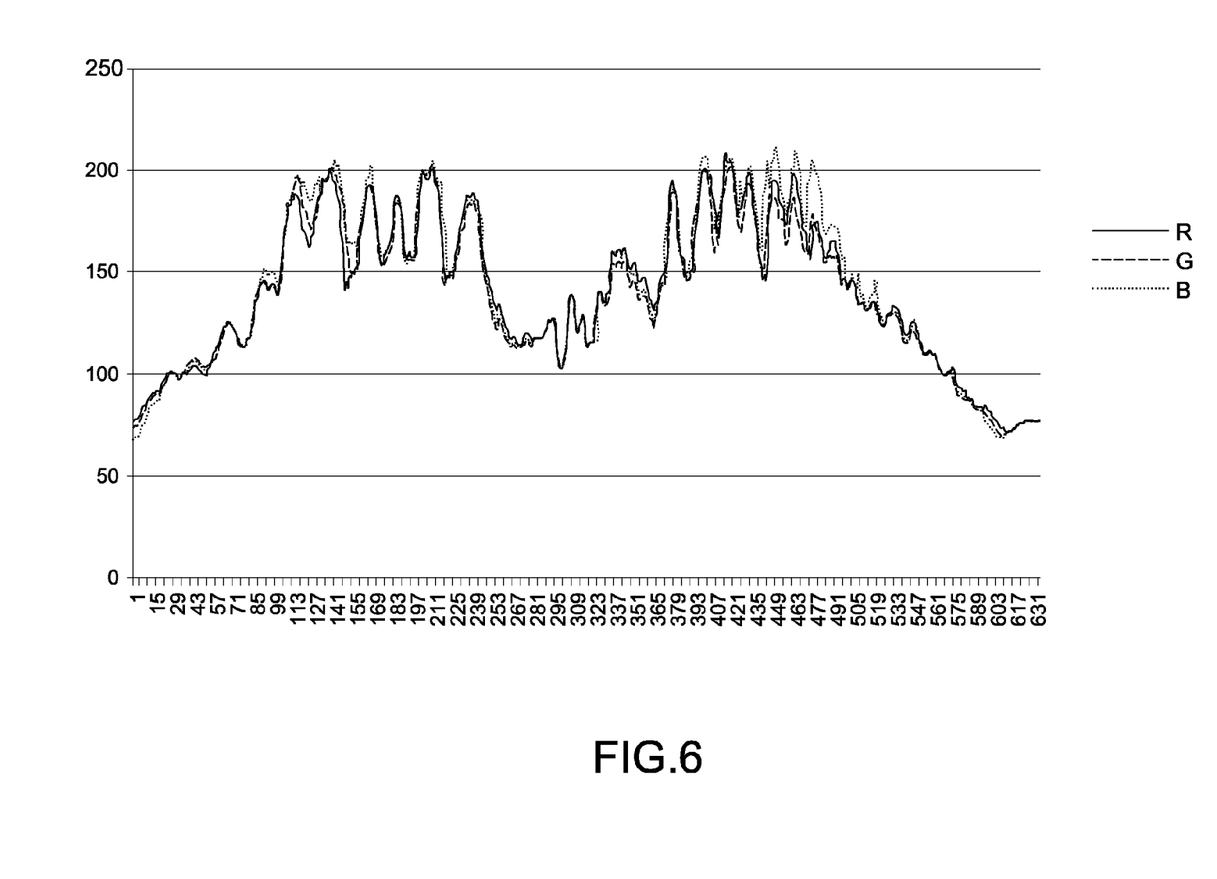
FIG. 6 shows another schematic diagram of the first chromaticity coordinate of the finger pressing according to one embodiment of the instant disclosure.

As such, when any forged fingerprint is placed on the pressing plate no significant change in Y-axis coordinate value would be present in the red wavelength curve. Illustrated in FIG. 6 showing another first chromaticity coordinate of the finger pressing, the red wavelength curve R shows no significant change compared to its counterpart in FIG. 5 because generally there is no discrepancy/difference in finger blood flow at the area where the finger pressing takes place and its surrounding areas. Plus, when the forged fingerprint is applied to the pressing plate no changes in the skin color may happen, resulting in the overlapping of the wavelength curves R, G and B. In short, the method of the instant disclosure may determine fingerprint authenticity based on whether the red wavelength curve R overlaps the green wavelength curve G and the blue wavelength curve B.

Further, in the method of the instant disclosure step 220 may be followed by the execution of the verification program 153 to determine whether the first chromaticity coordinate satisfies a first predetermined skin color threshold in order to arrive at the conclusion of whether the fingerprint is authentic. In one example, the following inequality may need to be satisfied before the determination of fingerprint authenticity could be made:

(R minus the minimum of B and G) is larger than Z (1); and

Z is between 10 and 100 (2)

wherein R represents the red wavelength value, G stands for the green wavelength value, and B is the blue wavelength value, with Z indicative of the first color threshold.

When the above example set of inequality is satisfied, the method may proceed to step 230. Otherwise, the method may go ahead to conclude the present fingerprint is a forged one. It should be noted that the above inequality set is only one embodiment, the scope of the instant disclosure is not limited as the result, since other inequality or even equations may be used to verify whether the first chromaticity satisfies the first predetermined skin color threshold. Such inequality/equations may be stored in the verification program 153.

However, since the forged fingerprints may be made in form of silicone material with replicated capillaries, the red wavelength curve R may be still larger than the green wavelength curve G and the blue wavelength curve B in terms of Y-axis coordinate. Therefore, step 230 may become necessary to provide another layer of the verification.

In step 230, the conversion program 152 may be executed to convert the first chromaticity coordinate into the second chromaticity coordinate using a second color model. For example, the conversion program 152 may convert the first chromaticity coordinate in the RGB color model to the second chromaticity coordinate in the CMYK color model as one example of the second color model. One example conversion formula could include converting the chromaticity coordinate in the RGB color model into three component colors in the CMYK color model:

$$t_{RGB} = \{R, G, B\}$$

$$t_{CMY} = \{C', M', Y'\} = \{1-R, 1-G, 1-B\}$$

If the minimum of the component color is equal to one, the chromaticity coordinate in the CMYK color model may be represented as:

$$\min\{C', M', Y'\} = 1, t_{CMYK} = \{0, 0, 0, 1\}$$

Otherwise, the first chromaticity coordinate in the RGB color model is converted to the four component colors according to the following equations:

$$K = \min\{C', M', Y'\}$$

$$t_{CMYK} = \left\{\frac{C'-K}{1-K}, \frac{M'-K}{1-K}, \frac{Y'-K}{1-K}, K\right\}$$

Therefore, the conversion program 152 may convert the first chromaticity coordinate in the RGB color model to the second chromaticity coordinate in the CMYK color model. That said, it should be noted that the conversion from the RGB color model to the CMYK color model is just ine example in the instant disclosure. Other conversions between the color models such as the chromaticity coordinate in the RGB color model to the chromaticity coordinate in the YUV color model, the chromaticity coordinate in the CIE XYZ color model, or to the chromaticity coordinate in the HSV color model may be considered or even carried out so as to closely track the skin color change in different chromaticity coordinates. However, it is further worth noting the first color model is not necessarily be the RGB color model, as it may be selected from a group consisting of the RGB color model, the YUV, the YCbCr color model, the RAW Bayer color model, the CCIR color model, the ITU color model, and the RAW RGB color model. In other words, the selection of the first color model may depend on the actual needs. Once after the first color model is selected, the first chromaticity coordinate associated with the selected first color model may be converted to the corresponding second chromaticity coordinate in the second color model, before the verification in step 240 is performed.

In step 240 to step 260, the verification program 153 may be adapted to compare the second chromaticity coordinate with the second predetermined skin color threshold, in order to determine the authenticity of the fingerprint. In one implementation, the second predetermined skin color threshold may be determined based on statistical analyses for the distribution of the actual skin color of the fingerprint in a variety of chromaticity coordinates such as the CMYK chromaticity coordinate, the YUV chromaticity coordinate, the CIE XYZ chromaticity coordinate and the HSV chromaticity coordinate.

Figure 7:
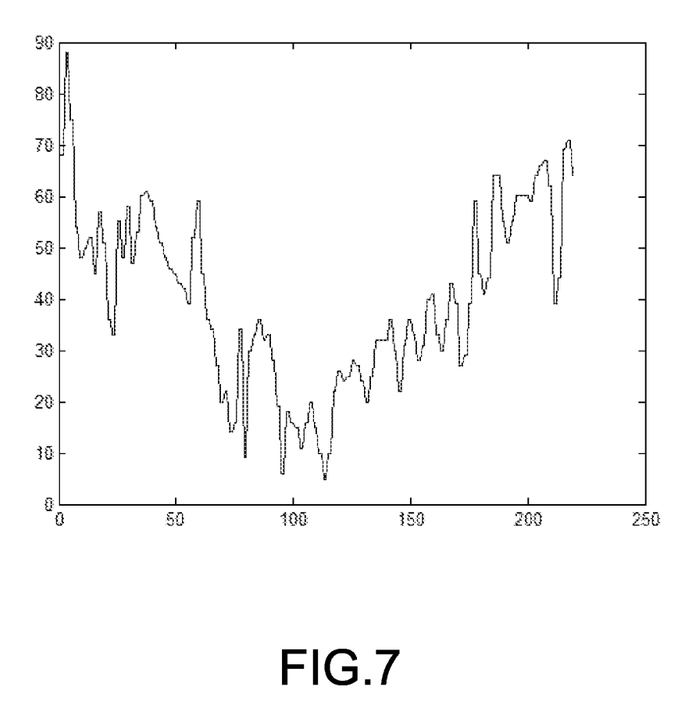
FIG. 7 shows a schematic diagram of the second chromaticity coordinate of an authentic fingerprint according to one embodiment of the instant disclosure.
Figure 8:
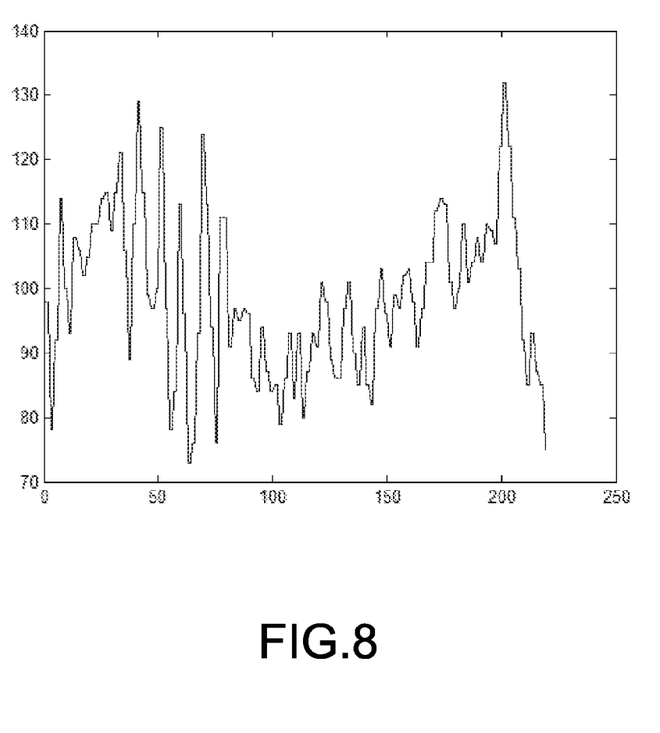
FIG. 8 is a schematic diagram of the second chromaticity coordinate of a forged fingerprint according to one embodiment of the instant disclosure.

Please refer to FIGS. 7 and 8, which are the second chromaticity coordinates for the authentic fingerprint and the forged fingerprint according to one embodiment of the instant disclosure, respectively. Another set of inequality may be used for the verification program 153 to determine fingerprint authenticity in the comparison between the second chromaticity coordinate and the second predetermined skin color threshold. For example, the inequality set may be:

$$Y \text{ is less than } Z' \qquad (1); \text{and}$$

$$Z' \text{ ranges between 10 and 100} \qquad (2)$$

In the above inequality, Y represents the yellow depth value, and Z' meanwhile represents the second skin color threshold. When the second skin color threshold falls within the predetermined range (e.g., between 10 and 100), the verification program 153 may affirm the authenticity of the fingerprint. Otherwise, the verification program 153 may conclude the fingerprint in the fingerprint image is a forged one. It should be noted that the above formula is only one example embodiment and the protective scope of the instant disclosure is not limited as the result since it can be set according to the actual needs to verify whether the second chromaticity coordinate satisfies the second skin color threshold. The inequality or even equations may be stored in the verification program 153 as well.

Thus, even in the case the capillaries of the finger are manmade to render possible the red wavelength curve R is larger than the green wavelength curve G and blue wavelength curve B in the first chromaticity coordinate the conversion to the second chromaticity coordinate from the first chromaticity coordinate and the comparison between the second chromaticity coordinate and the second predetermined skin color threshold collectively helps verify the authenticity of the fingerprint.

Therefore, in the instant disclosure fingerprint authenticity could be verified via the conversion of the first chromaticity coordinate to the second chromaticity coordinate, which may be further compared with the second predetermined skin color threshold. Consequently, the accuracy of verifying the authenticity of the fingerprint may increase to minimize the possibility of the forged fingerprint being considered authentic after passing the muster of the first layer of the protection (i.e., whether the first chromaticity coordinate satisfies the first predetermined skin color threshold).

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A method for determining fingerprint authenticity comprising:
    capturing a fingerprint image;
    performing an analysis program when executed analyzing the fingerprint image using a first color model to obtain a first chromaticity coordinate corresponding to the fingerprint image, wherein using the first color model to obtain the first chromaticity coordinate further comprises:
    setting a RGB color model as the first color model;
    obtaining the first chromaticity coordinate based on the RGB model and obtaining a red wavelength curve, a blue wavelength curve, and a green wavelength curve according to the first chromaticity coordinate;
    determining whether the red wavelength curve overlaps the green wavelength curve and the blue wavelength curve; and
    having a conversion program executed when the red wavelength curve fails to overlap the blue wavelength curve and the green wavelength curve;
    performing the conversion program when executed converting the first chromaticity coordinate into a second chromaticity coordinate;
    performing a verification program when executed determining whether the second chromaticity coordinate satisfies a second predetermined skin color threshold;
    when the second chromaticity coordinate satisfies the second predetermined skin color threshold, confirming the fingerprint image is authentic; and
    otherwise concluding the fingerprint image is forged.

2. The method according to claim 1, wherein capturing the fingerprint image further comprises dividing the fingerprint image into a plurality of sub-fingerprint images before sequentially transmitting the sub-fingerprint images to the analysis program.

3. The method according to claim 2, wherein the second color model is selected from a group consisting of a CMYK color model, a YUV color model, a CIE XYZ color model, and a HSV color model.

4. The method according to claim 1, wherein to obtain the first chromaticity coordinate further comprises performing the verification program to determine whether the first chromaticity coordinate satisfies a first predetermined skin color threshold.

5. A device for determining fingerprint authenticity having a light-emitting element for emitting a light to a finger and an image sensor for receiving a reflected light from the finger to obtain a fingerprint image, comprising:
    a central processing unit, having:
        an analysis program for analyzing the fingerprint image using a first color model to obtain a first chromaticity coordinate;
        a conversion program for converting the first chromaticity coordinate to a second chromaticity coordinate using a second color model; and
        a verification program for determining whether the second chromaticity coordinate satisfies a second predetermined skin color threshold,
    wherein the analysis program is configured to set a RGB color model as the first color model, obtain the first chromaticity coordinate based on the RGB model, obtain a red wavelength curve, a blue wavelength curve, and a green wavelength curve according to the first chromaticity coordinate, determine whether the red wavelength curve overlaps the green wavelength curve and the blue wavelength curve, and execute the conversion program when the red wavelength curve fails to overlap the blue wavelength curve and the green wavelength curve.

6. The device according to claim 5, further comprising a circuit board on which the central processing unit, the light-emitting element, and the image sensor are placed, with the central processing unit electrically connected to the light-emitting element and the image sensor.

7. The device according to claim 5, wherein the central processing unit is configured to trigger the light-emitting element to emit the light in a single wavelength or the light with multiple wavelengths.

8. The device according to claim 5, wherein the central processing unit is configured to divide the fingerprint image into a plurality of sub-fingerprint images and sequentially transmit the sub-fingerprint images to the analysis program.

* * * * *